(12) United States Patent
Takayama

(10) Patent No.: US 12,212,807 B2
(45) Date of Patent: Jan. 28, 2025

(54) TRANSMISSION APPARATUS, COMMUNICATION METHOD AND PROGRAM

(71) Applicant: NIPPON TELEGRAPH AND TELEPHONE CORPORATION, Tokyo (JP)

(72) Inventor: Chihiro Takayama, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 127 days.

(21) Appl. No.: 18/010,512

(22) PCT Filed: Jun. 16, 2020

(86) PCT No.: PCT/JP2020/023617
§ 371 (c)(1),
(2) Date: Dec. 15, 2022

(87) PCT Pub. No.: WO2021/255831
PCT Pub. Date: Dec. 23, 2021

(65) Prior Publication Data
US 2023/0262283 A1 Aug. 17, 2023

(51) Int. Cl.
*H04N 21/432* (2011.01)
*G10L 15/22* (2006.01)
*H04N 7/14* (2006.01)
*H04N 21/488* (2011.01)

(52) U.S. Cl.
CPC ......... *H04N 21/4325* (2013.01); *G10L 15/22* (2013.01); *H04N 7/148* (2013.01); *H04N 21/4884* (2013.01)

(58) Field of Classification Search
CPC ............... H04N 21/4325; H04N 7/148; H04N 21/4884; G10L 15/22
See application file for complete search history.

(56) References Cited

U.S. PATENT DOCUMENTS

| | | | | |
|---|---|---|---|---|
| 2007/0085575 | A1* | 4/2007 | Cooper | H04N 21/43072 348/E5.122 |
| 2009/0282452 | A1* | 11/2009 | Wei | H04N 21/43072 725/118 |
| 2012/0154514 | A1* | 6/2012 | Ueno | H04N 7/147 348/14.08 |

FOREIGN PATENT DOCUMENTS

JP    2019053473 A    4/2019

OTHER PUBLICATIONS

NTT BizLink, Inc. "NTT BizLink's Video Conferencing Service, No. 1 Market Share in Japan for 6 Consecutive Years"SMART" supports real-time translation" [online] Accessed on May 22, 2019, website: https://www.nttbiz.com/news/20190522.

* cited by examiner

*Primary Examiner* — Sunghyoun Park

(57) ABSTRACT

A transmission device used on a receiver side in a communication system for communication between a talker and a receiver includes a processing unit that processes voice data obtained from speech of the talker to generate information data corresponding to the voice data, a pseudo video generation unit that generates pseudo video data having a playback time length corresponding to a length of a delay time caused by the processing unit, and a transmission unit that transmits the pseudo video data to the receiver side and then transmits video data during the speech of the talker and the information data to the receiver side.

20 Claims, 12 Drawing Sheets

Fig. 6

| No. | PLAYBACK TIME | VIDEO DATA |
|---|---|---|
| 1 | 0.3 SECONDS | (VIDEO OF ADJUSTING POSTURE) |
| 2 | 0.5 SECONDS | (VIDEO OF SHAKING BODY) |
| 3 | 1.0 SECOND | (VIDEO OF NODDING) |
| 4 | 3.0 SECONDS | (VIDEO OF FACING DOWNWARD) |
| ... | ... | ... |
| 10 | 10 SECONDS | (VIDEO OF THINKING POSE WITH HAND PUT ON CHIN) |

TRANSMISSION APPARATUS, COMMUNICATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/023617, filed on 16 Jun. 2020, the disclosure of which is hereby incorporated herein by reference in its entirety.

TECHNICAL FIELD

The present disclosure relates to a communication system for remote communication between a talker and a receiver.

BACKGROUND ART

A known technique for a communication system includes a teleconference system including voice recognition and translation functions (NPL 1, for example). Such a teleconference system enables communication between a talker and a receiver using text or synthetic voice obtained by translating utterance content into different languages in remote conversation between persons with different mother languages.

The aforementioned teleconference system achieves communication by processing, such as voice recognition, translation, and voice synthesis on voice.

Such a teleconference system achieves multi-modal communication having a combination of voice, text, gesture, or the like in remote communication between persons including persons with disabilities such as hearing difficulties or visual difficulties.

Also, some users of alternate voice (an esophageal speech method or an electrolarynx, for example) do not want counterparts to directly hear voice generated by alternate voice and can use text communication or utterances using synthetic voice.

CITATION LIST

Non Patent Literature

NPL 1: https://www.nttbiz.com/news/20190522, retrieved on Jun. 9, 2020

Patent Literature

PTL 1: JP 2019-053473 A

SUMMARY OF THE INVENTION

Technical Problem

However, voice processing (recognition, translation, and synthesis) takes time in the related art such as in the aforementioned teleconference system, and a time gap may occur between information of processed voice and a real-time video.

To prevent the aforementioned time gap and synchronously play back the voice and the video, intentionally delaying the video to generate a time gap is conceivable. However, intentionally generating a time gap for the video as well causes a delay from a start of conversation of a talker to a start of playback of video data on a side of a receiver as a whole.

The delay until the start of playback in conversation in the communication system may be a cause of lowering the perceived reaction performance of the system and degrading interactivity and meaning of the conversation may not be conveyed or may be misunderstood in some cases.

In regard to such an issue, a communication device that transmits text information or synthetic voice information of an agreeable response in a pseudo manner has been proposed to reduce a perceived delay (PTL 1). However, a time gap may occur between a video and an agreeable response or subtitle information in using a teleconference.

The present disclosure has been made in view of the aforementioned point, and an object thereof is to provide a technique for making a receiver unaware of a delay in a communication system that transmits video data with a delay.

Means for Solving the Problem

The disclosed technology provides a transmission device used on a talker side in a communication system for communication between a talker and a receiver. The transmission device includes a processing unit that processes voice data obtained from speech of the talker to generate information data corresponding to the voice data, a pseudo video generation unit that generates pseudo video data having a playback time length corresponding to a length of a delay time caused by the processing unit, and a transmission unit that transmits the pseudo video data to the receiver side and then transmits video data during the speech of the talker and the information data to the receiver side.

Effects of the Invention

The disclosed technology provides a technology for making a receiver unaware of a delay in a communication system that transmits video data with a delay.

BRIEF DESCRIPTION OF DRAWINGS

FIG. 6 is a diagram illustrating an example of data stored in a video recording unit.

DESCRIPTION OF EMBODIMENTS

Hereinafter, an embodiment of the present disclosure (the present embodiment) will be described with reference to the accompanying drawings. The embodiment to be described below is an example, and embodiments to which the present disclosure is applied are not limited to the following embodiment.

Outline of Embodiment

According to the technology in the present embodiment, video data is caused to be delayed by an amount corresponding to a processing time of voice data in a transmission device 100 on a talker side and is then transmitted to a reception device 200 on a receiver side in a communication system for communication between the talker and the receiver. Although a delay occurs in the reception device 200 on the receiver side until a start of playback of the video data, multi-modal communication using voice, video, text, and the like is achieved by making the receiver unaware of the delay by playing back specific voice and video during the delay time.

Figure 1:
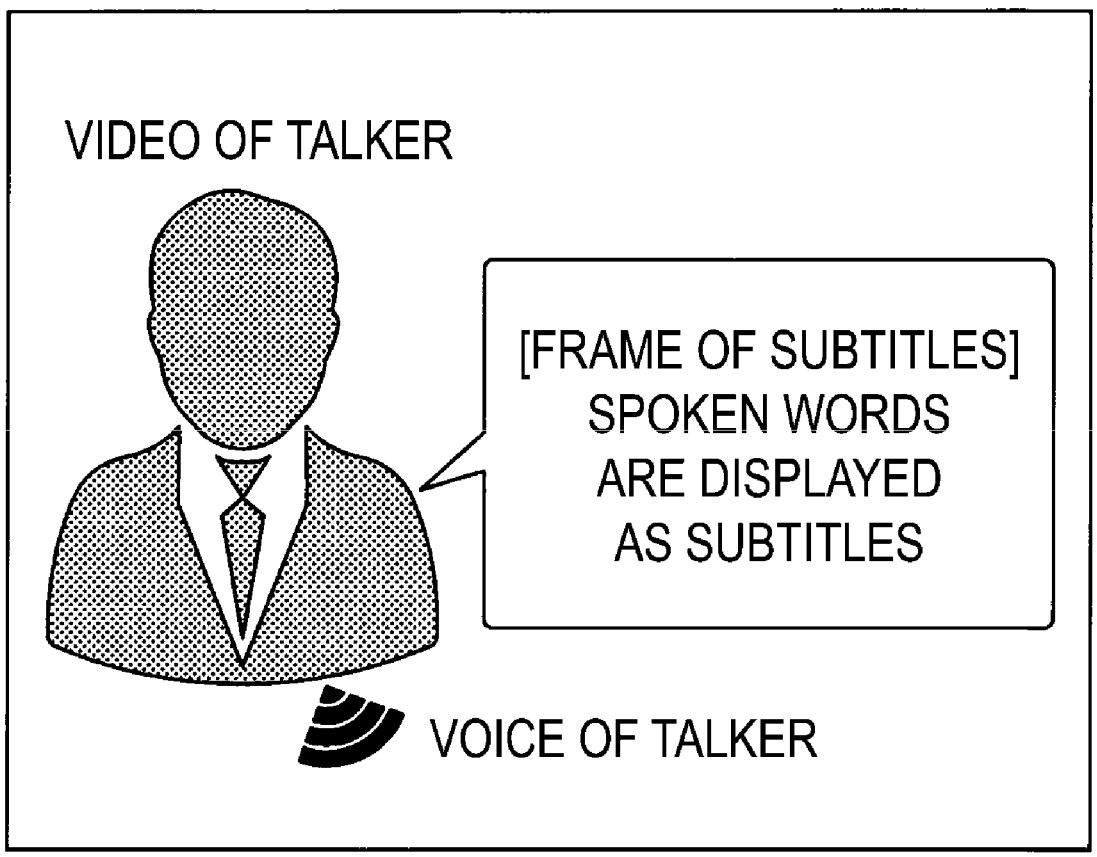
FIG. 1 is a diagram illustrating an example of a display screen.

FIG. 1 is a diagram illustrating an image of a screen displayed on the reception device 200 on the receiver side. In the present embodiment, when the talker starts speech, then the transmission device 100 obtains video data and voice data. However, a delay time occurs in transmission (playback on the receiver side) of the video data (and subtitles) due to processing (creation of the subtitles, for example) of the voice data. Thus, pseudo video data is transmitted to the reception device 200, and the reception device 200 is caused to play back the pseudo video data until it becomes possible to play back the video with a delay before the transmission of the video data (and the subtitles).

On the screen on the receiver side, a video of the talker based on the pseudo video data is displayed first, and a video of the talker with a delay, subtitles, and the like are then displayed after the delay time (gap time). This enables communication by making the receiver unaware of the delay.

Specifically, the gap time length (the delay time length) between data after the processing generated through voice processing and a real-time video is constantly estimated using a previous communication record, and (a) a nodding motion, (b) a change in posture, and (c) subtitle frame animation display, or a combination thereof is played back instead as a pseudo video until it becomes possible to play back voice and video with the delay, in accordance with how large the time gap is.

For (a) the nodding motion and (b) the change in posture used here, a video registered in advance can be used, or data obtained from conversation until then can also be used.

Hereinafter, configurations and operations of the transmission device 100 and the reception device 200 for achieving communication as described above will be described in detail.

Device Configuration

Figure 2:
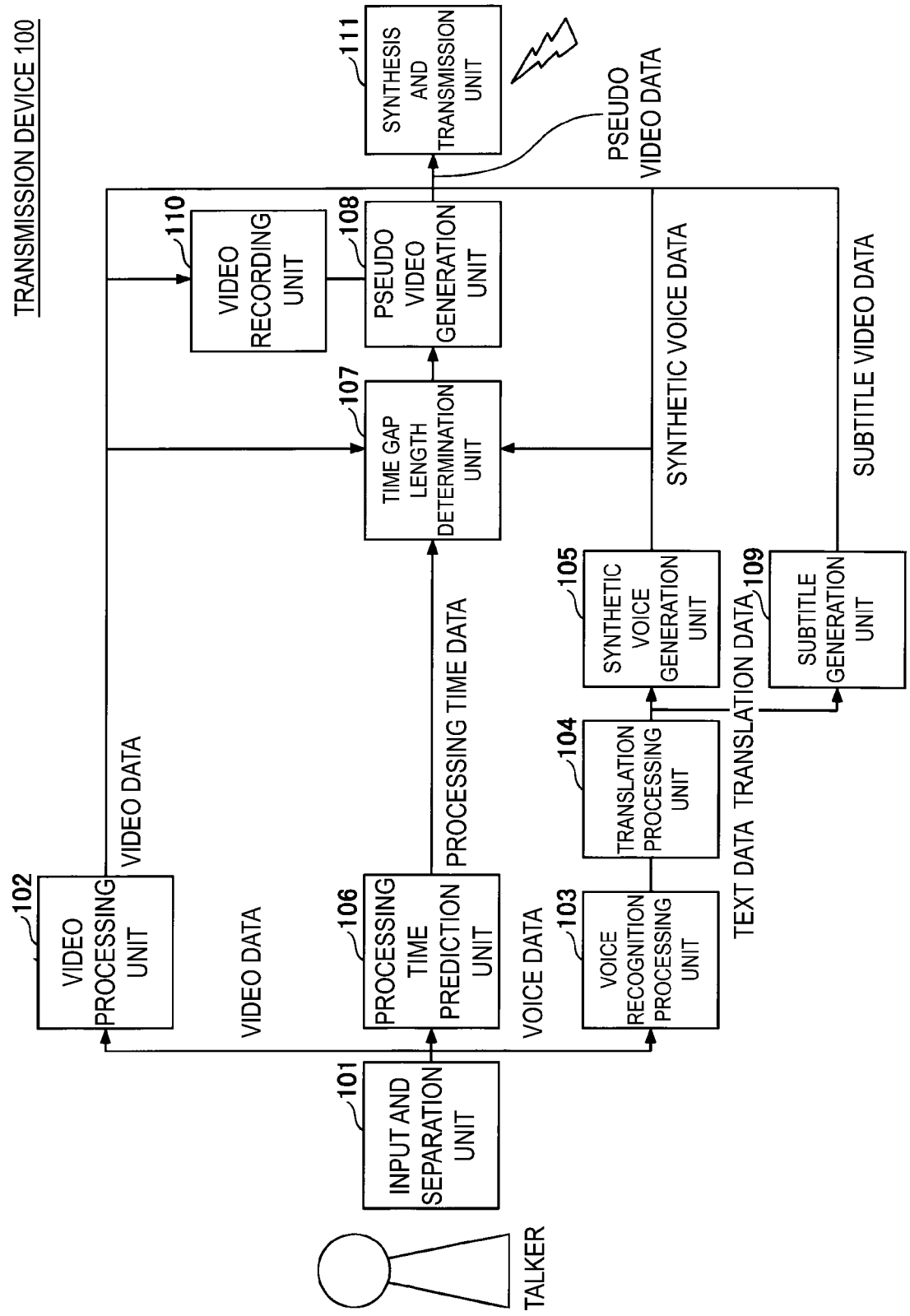
FIG. 2 is a configuration diagram of a transmission device.

FIG. 2 is a configuration diagram of the transmission device 100 which is a device on the transmission side according to the embodiment of the present disclosure. As illustrated in FIG. 2, the transmission device 100 according to the present embodiment includes an input and separation unit 101, a video processing unit 102, a voice recognition processing unit 103, a translation processing unit 104, a synthetic voice generation unit 105, a processing time prediction unit 106, a time gap length determination unit 107, a pseudo video generation unit 108, a subtitle generation unit 109, a video recording unit 110, and a synthesis and transmission unit 111. A part constituted by "the voice recognition processing unit 103, the translation processing unit 104, the synthetic voice generation unit 105, and the subtitle generation unit 109" may also be referred to as a "processing unit". Also, the time gap length determination unit 107 may also be referred to as a "determination unit". In addition, the synthesis and transmission unit 111 may also be referred to as a "transmission unit". An overview of operations of each component is as follows.

The input and separation unit 101 is a functional unit constituted by a camera, a microphone, and the like. The input and separation unit 101 acquires behaviors and utterances (speech) of the talker as video data and voice data, separates the video data from the voice data, sends the video data to the video processing unit 102, and sends the voice data to the voice recognition processing unit 103 and the processing time prediction unit 106. At this time, the input and separation unit 101 applies a time stamp to each piece of data.

The video processing unit 102 sends the video data to the time gap length determination unit 107 and the synthesis and transmission unit 111. The voice recognition processing unit 103 converts the voice data into text data using an existing technology.

The translation processing unit 104 is optional, performs translation processing from the text data sent from the voice recognition processing unit 103 into a different language and sends translation result data to the synthetic voice generation unit 105 and the subtitle generation unit 109.

The synthetic voice generation unit 105 performs voice synthesis based on an existing technology using the translation result data transmitted from the translation processing unit 104 and sends the synthetic voice data to the time gap length determination unit 107 and the synthesis and transmission unit 111.

The processing time prediction unit 106 predicts a time (a time length from acquisition of the voice data to completion of the processing) required to complete processing with respect to from the voice recognition processing unit 103 to the synthetic voice generation unit 105 or from the voice recognition processing unit 103 to the subtitle generation unit based on the voice data obtained from the input and separation unit 101 and transmits processing time data to the time gap length determination unit 107. The prediction processing can be learned with information regarding a past gap time output by the time gap length determination unit 107, which will be described later.

The time gap length determination unit 107 sets the processing time data from the processing time prediction unit 106 as a gap time as an initial value, measures a time indicating how large the actual time gap between the video and the voice is from the information of the time stamps of the video data from the video processing unit 102 and the voice data from the synthetic voice generation unit 105 (or the subtitle generation unit 109), and updates the gap time previously determined. For example, it is possible to determine a difference between a time stamp of video data at present (real time) and a time stamp of the voice data that is a target of voice synthesis or subtitle generation as a gap time (delay time) of playback timing.

Information regarding the gap time is periodically transmitted to the pseudo video generation unit 108 after the processing time prediction unit 106 sets the gap time.

The pseudo video generation unit 108 acquires the video data from the video recording unit 110 from the information regarding the gap time from the time gap length determination unit 107, generates pseudo video data, and transmits the pseudo video data to the synthesis and transmission unit 111.

The subtitle generation unit 109 generates subtitle video data using the translation result data sent from the translation processing unit 104.

The synthesis and transmission unit 111 synthesizes the video data, the pseudo video data, the synthetic voice data, and the subtitle video data in accordance with a rule, which will be described later, converts the data into a transmittable format (network packets, for example), and transmits the data.

Figure 3:
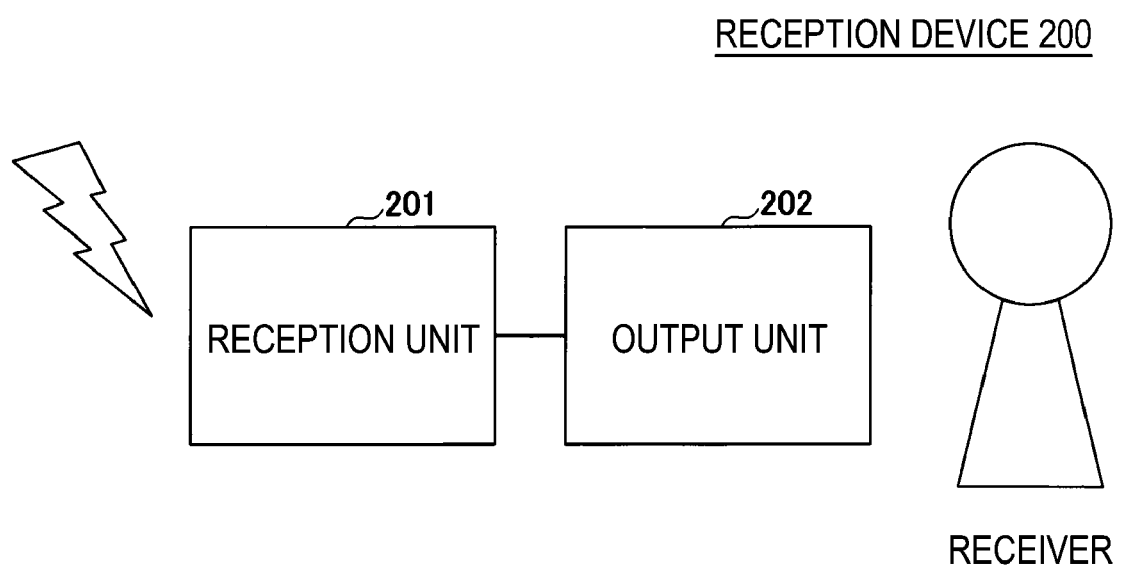
FIG. 3 is a configuration diagram of a reception device.

FIG. 3 is a configuration diagram of the reception device 200 which is a device on the reception side according to the embodiment of the present disclosure. As illustrated in FIG. 3, the reception device 200 according to the present embodiment includes a reception unit 201 and an output unit 202. Operations of each component are as follows.

The reception unit 201 transmits data obtained from the synthesis and transmission unit 111 of the transmission device 100 to the output unit 202. The output unit 202 includes devices such as a monitor and a speaker and plays back and outputs the data received from the reception unit 201 as a video and voice.

Processing Time Prediction Unit 106

Figure 4:
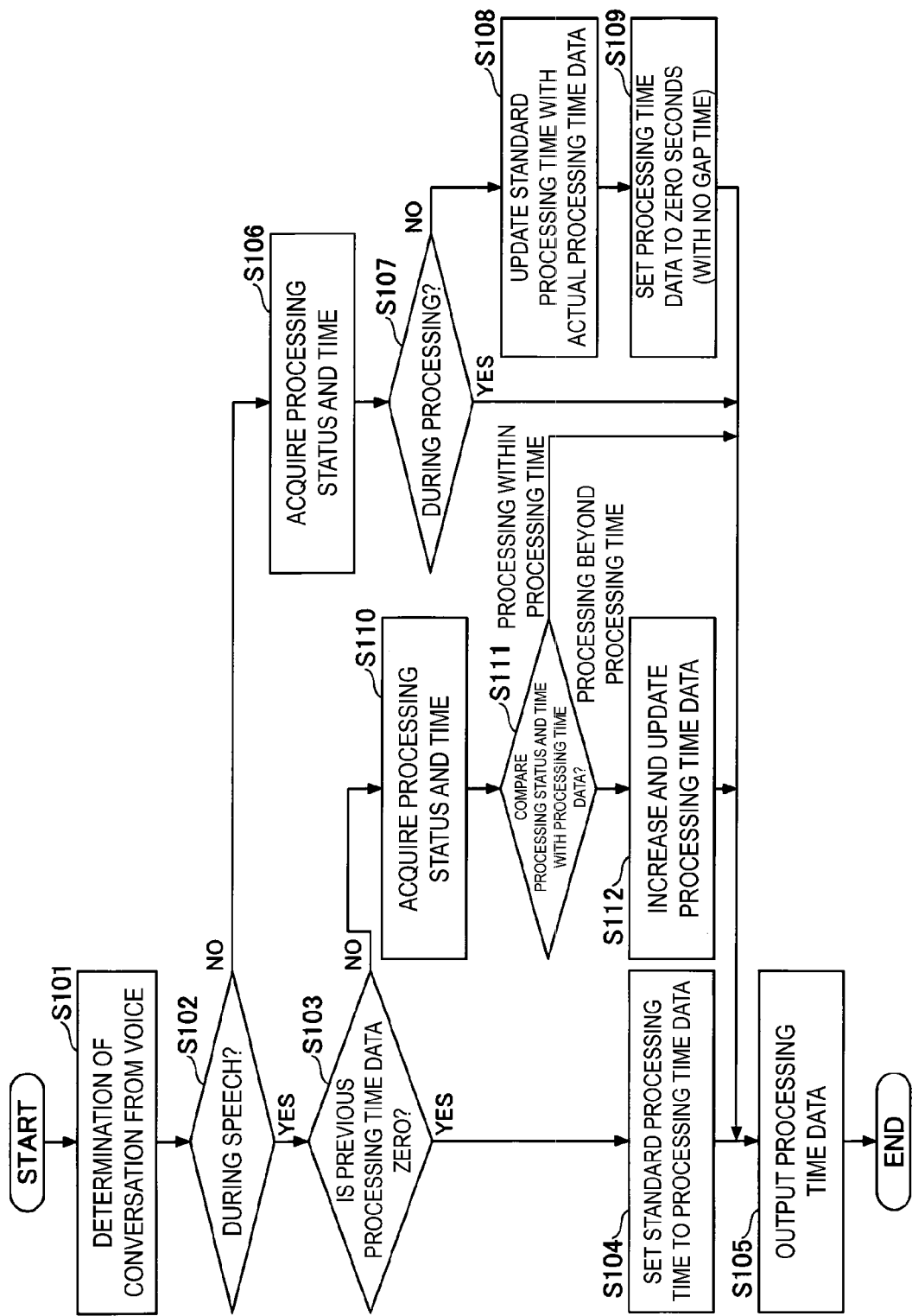
FIG. 4 is a flowchart illustrating operations of a processing time prediction unit.

Hereinafter, details of processing for predicting (a value of) processing time data of the processing time prediction unit 106 will be described in more detail with reference to the flowchart in FIG. 4. The processing of the flow illustrated in FIG. 4 is repeated at predetermined time intervals.

In S101, the processing time prediction unit 106 specifies a specific time frame from the voice data obtained from the input and separation unit 101 and determines whether the talker is speaking during the period.

For example, 0.01 seconds (10 msec) or the like is used as the specific time frame. For the determination, any one of or both information indicating whether voice at a specific level or more is included in a waveform of the voice data and information indicating whether the mouth of the talker is open and closed in the video data may be used. Additionally, an existing voice section detection technology and the like may be used. For example, it is possible to use a technology disclosed in "Kentaro Ishizuka, Masakiyo Fujimoto, and Tomohiro Nakatani (2009), Advances in voice activity detection, The Journal of the Acoustical Society of Japan, 65(10), 537-543".

In a case in which it is determined that the talker is speaking (Yes in S102), and if previous processing time data is zero (Yes in S103), then the processing time prediction unit 106 outputs a standard processing time as processing time data (S104, S105). In other words, a standard processing time is output as the processing time data first. For example, it is possible to use a prescribed value such as a standard processing time=1 second (1,000 msec).

As the standard processing time, a prescribed time may be determined in advance by the system, and the prescribed value may be changed based on a performance of a computer that executes the program according to the embodiment. Also, the standard processing time may be increased or reduced and set depending on whether to perform voice synthesis processing, translation processing, subtitle generation processing, and the like.

In a case in which it is determined that the talker is still speaking (Yes in S102), and in a case in which the previous processing time data is not zero (No in S103), the processing time prediction unit 106 acquires a processing condition and a processing time from the voice recognition processing unit 103 to the synthetic voice generation unit 105 or from the voice recognition processing unit 103 to the subtitle generation unit 109 in S110.

In S111, the processing time prediction unit 106 compares the processing time from the voice recognition processing unit 103 to the synthetic voice generation unit 105 or the processing time from the voice recognition processing unit 103 to the subtitle generation unit 109 with the processing time data. In a case in which the processing time exceeds the value of the output processing time data, the processing time prediction unit 106 increments and updates the processing time data by a specific time width (S112) and outputs the updated processing time data (S105). If the processing time is within the output processing time data, the processing time prediction unit 106 outputs the current processing time data without updating the processing time data.

As the increment width in S112, about ⅕ of the standard processing time, such as 0.2 seconds (200 msec), for example, can be set.

At this time, the processing time prediction unit 106 recognizes occurrence of a delay of processing from actual processing conditions and times at the voice recognition processing unit 103, the translation processing unit 104, the synthetic voice generation unit 105, and the subtitle generation unit 109.

In a case in which S112 (incrementing and updating the processing time) continues, the time gap length determination unit 107 and the pseudo video generation unit 108 continuously perform reception for a longer time than that of the initially received processing time data from the processing time prediction unit 106.

In a case in which it is determined that the talker is not speaking (No in S102), the processing time prediction unit 106 acquires processing conditions and processing times from the voice recognition processing unit 103 to the synthetic voice generation unit 105 or from the voice recognition processing unit 103 to the subtitle generation unit 109 in S106.

If the processing time prediction unit 106 detects that no processing has been performed at the voice recognition processing unit 103 to the synthetic voice generation unit 105 or at the voice recognition processing unit 103 to the subtitle generation unit 109 (No in S107), then the processing time prediction unit 106 updates the standard processing time with data of a processing time actually needed (S108), sets the processing time data to zero seconds (with no gap time) (S109), and outputs the processing time data (S106).

If the processing time prediction unit 106 detects that the voice recognition processing unit 103 to the synthetic voice generation unit 105 or the voice recognition processing unit 103 to the subtitle generation unit 109 are performing processing (Yes in S107), the processing time prediction unit 106 outputs the processing time data output until then.

Figure 5:
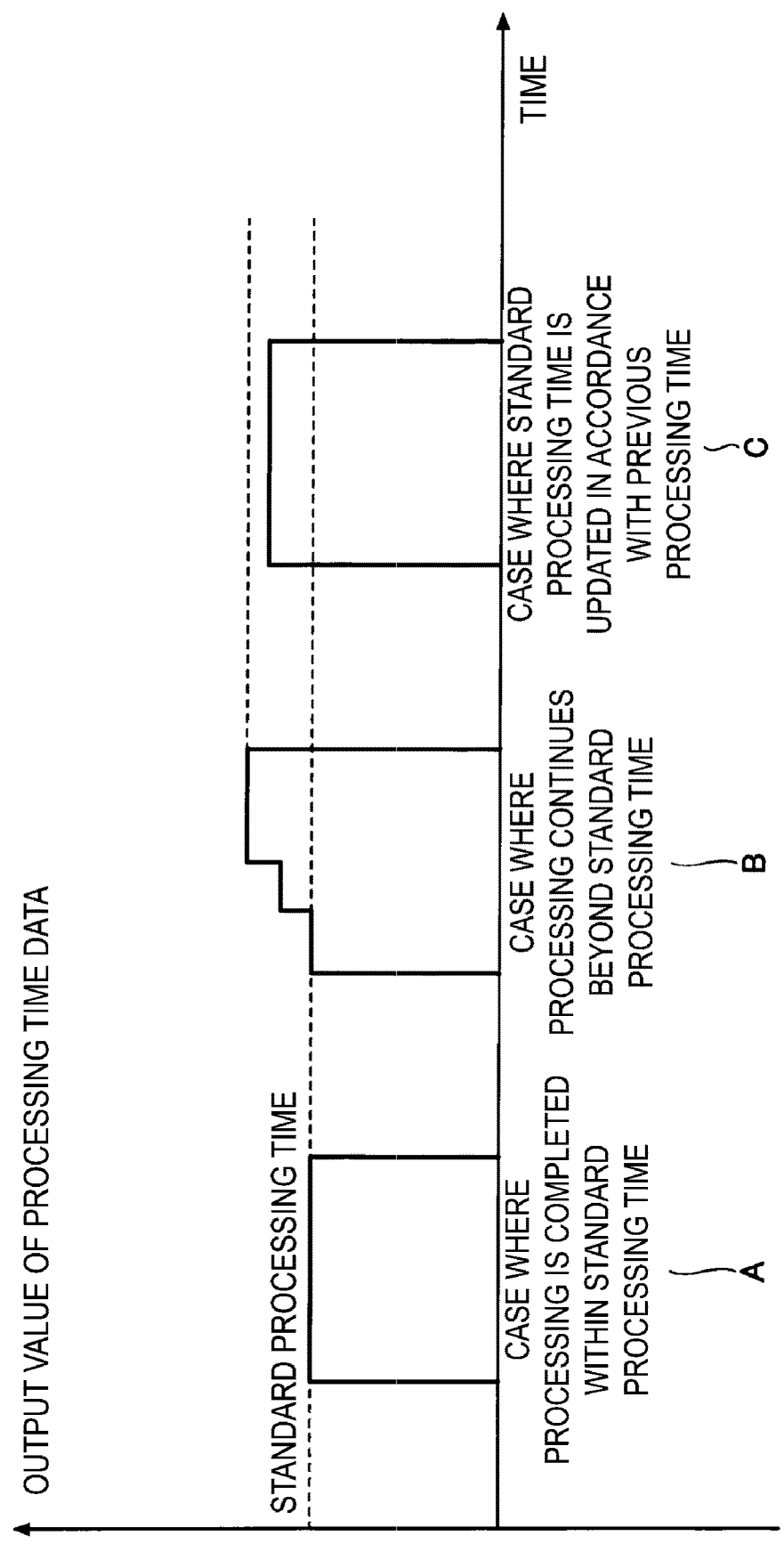
FIG. 5 is a diagram for explaining operations of the processing time prediction unit.

FIG. 5 is a diagram illustrating an example of the processing time data output through the aforementioned processing. Because the processing has been completed within the standard processing time during speech until the time indicated by A as illustrated in FIG. 5, the standard processing time is output as a value of the processing time data. The speech then stops, the processing also stops, the standard processing time is updated (without any change), and zero is output as the processing time data.

At the time indicated by B, the processing time data starts from the standard processing time, and the processing is performed in a processing time exceeding the standard processing time during speech, the value of the processing time data is incremented by the predetermined time width. The speech then stops, the processing also stops, the standard processing time is updated (updated to the size indicated by the time C), and zero is output as the processing time data.

The processing is completed within the standard processing time during the speech at the time indicated by C, and the updated standard processing time is output as the value of the processing time data.

Video Recording Unit 110 and Pseudo Video Generation Unit 108

Next, details of processing performed by the video recording unit 110 and the pseudo video generation unit 108 will be described in detail.

The video recording unit 110 records video data regarding behaviors in conversation with the talker along with playback time thereof. FIG. 6 illustrates an example of data recorded in the video recording unit 110.

The pseudo video generation unit 108 acquires video data of a playback time that is the closest to the length of a gap time (delay time) between playback timings of the video data (video data in real time at present) and synthetic voice data (or subtitle video data) measured by the time gap length determination unit 107 (equal to the time length until completion of the processing performed by the synthetic voice generation unit 105 or the subtitle generation unit 109 after completion of the processing performed by the input and separation unit 101), for example, from the video recording unit 110 in accordance with the length of the gap time.

Thereafter, the pseudo video generation unit 108 converts a playback speed of the video data in accordance with the length of the gap time of the playback timings as needed to generate pseudo video data.

In a case in which the length of the gap time of the playback timings is 3 seconds, and the playback time of the video data acquired from the video recording unit 110 is 2.5 seconds, for example, pseudo video data is generated by playing back the acquired video data at a speed of 2.5/3 times=0.83 times.

A more specific processing example will be described with reference to the flowchart in FIG. 7. In the processing example, in a case in which the length of the gap time of the playback timings is longer than the playback time of all videos recorded in the video recording unit 110, processing of acquiring data with long playback times, for example, top five pieces from the video recording unit 110 and repeating random selection of video data is performed.

Figure 7:
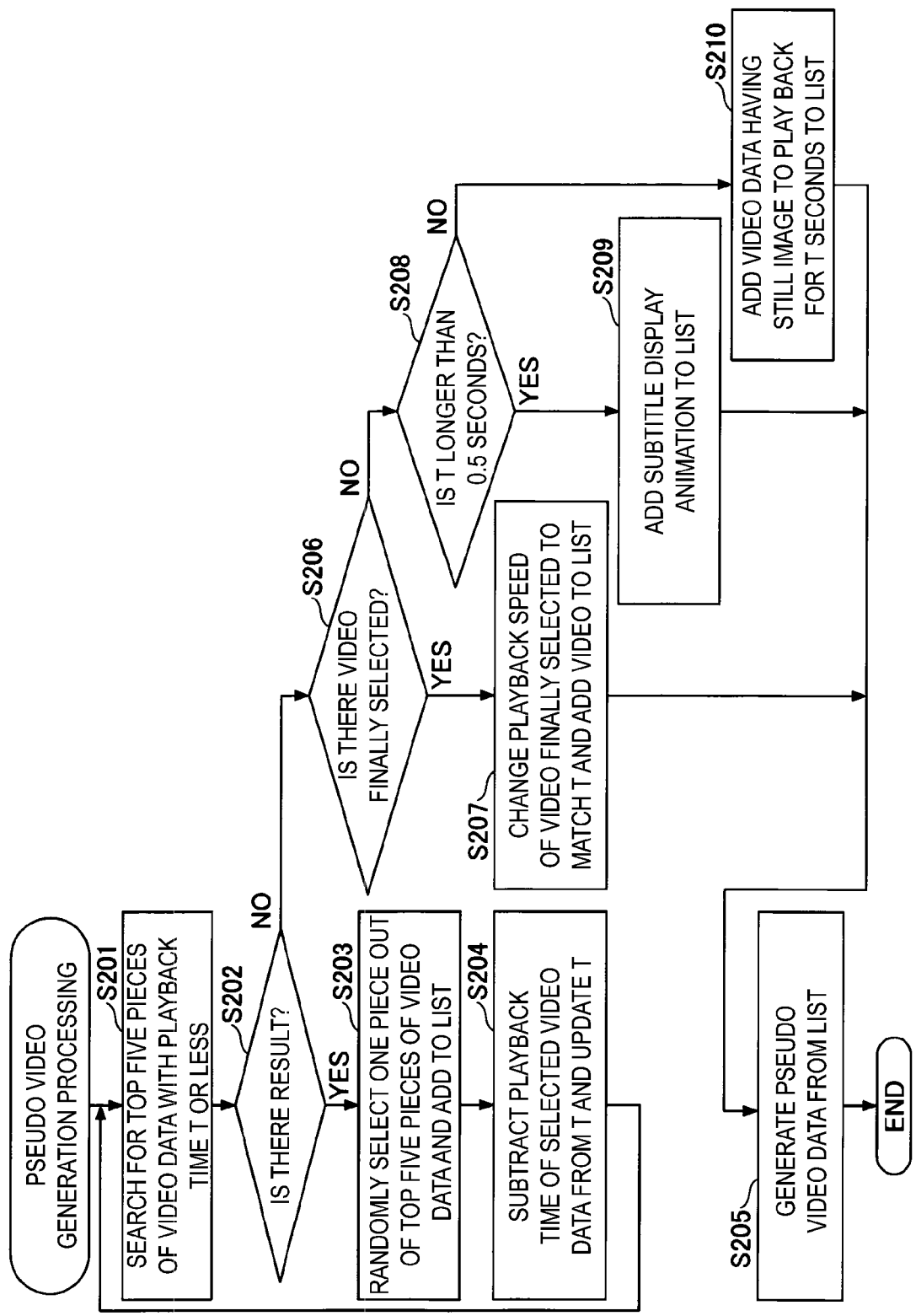
FIG. 7 is a flowchart illustrating operations of a pseudo video generation unit.

In other words, the pseudo video generation unit 108 searches for (extracts) the top five pieces of video data with playback times equal to or less than T (all pieces of video data with playback times equal to or less than T in a case in which the number of pieces of data is less than five) from the video recording unit 110 in S201 in FIG. 7 on the assumption that T is the length of the gap time of the playback timings. The top five pieces is an example.

In a case in which there is a search result (Yes in S202), that is, in a case in which a search result of video data with playback time lengths equal to or less than T is obtained, the pseudo video generation unit 108 randomly selects one of the top five pieces of video data and adds the selected data to a list in S203.

In S204, the pseudo video generation unit 108 updates T by subtracting a playback time of the selected video data from T and determining the result as a new T value. The processing returns to S201, and the aforementioned processing is repeated again.

In a case in which there is no search result in S202 (No in S202), the processing proceeds to S206 to determine whether there is video data finally selected. If at least one piece of video data has been obtained in the processing in S201 to S204, the result of the determination in S206 is Yes.

In a case in which the result in S206 is Yes, in S207, the pseudo video generation unit 108 changes the playback speed of the finally selected video data in accordance with T and adds the playback speed to the list. For example, it is assumed that two pieces of video data, namely video data 1 and video data 2 have been obtained, the video data 2 is the final video data, T at this point is 2 seconds, and the playback time of the video data 2 is 1 second. In this case, the playback speed of the video data 2 is converted such that the playback time of the video data 2 is 2 seconds, and the video data 2 is then added to the list.

In a case in which the result in S206 is No, that is, in a case in which no video data is obtained in S201 to S204, the processing proceeds to S208 to determine whether T is longer than 0.5 seconds. In a case in which T is longer than 0.5 seconds (Yes in S208), the pseudo video generation unit 108 adds a subtitle display animation to the list (S209). The subtitle display animation is an example of video data obtained in advance.

In a case in which the result of the determination in S208 is No, that is, in a case in which T is equal to or less than 0.5 seconds, the processing proceeds to S210, and the pseudo video generation unit 108 adds, to the list, the video data in which a still image is played back for T hours.

In S205, the pseudo video generation unit 108 generates pseudo video data by connecting the video data in the list. A specific example is as follows.

In a case in which the length of the gap time of the playback timings is 13 seconds, for example, the pseudo video generation unit 108 connects video data with a playback time that is as long as 10 seconds, video data of 2 seconds, and video data of 1 second and generates data as pseudo video data with a playback time of 13 seconds using the video recording unit 110.

As a combination at this time, one piece of video data (video data of 10 seconds at this time) is selected from the top five pieces of data equal to or less than 13 seconds. Next, selection of choosing one piece (video data of 2 seconds at this time) of top five pieces of video data equal to or less than 3 seconds obtained by subtracting the playback time of the video data from the original time gap of the playback timings is repeated. In a case in which the time gap of the playback timings does not match the playback time of the video data as a result of repeating the selection, the playback speed of the video data is changed.

In a case in which the time gap of the playback timings is too short to search for the corresponding video data, for example, in a case in which the time gap of the playback timings is longer than 0.5 seconds, animation of less than 1 second is displayed, for example. A specific pattern of animation may be repeated or randomly played back. The playback speed may be changed in accordance with the length of the gap time. As an example of the animation, there is an animation in which a frame for displaying subtitles is opened.

In a case in which the gap time of the playback timings is yet shorter, a still image acquired from video data is played back by the amount corresponding to the length of the gap time.

The pseudo video generation unit 108 finally generates one piece of pseudo video data from the selected plurality of pieces of video data while changing the playback speed as needed.

Figure 8:
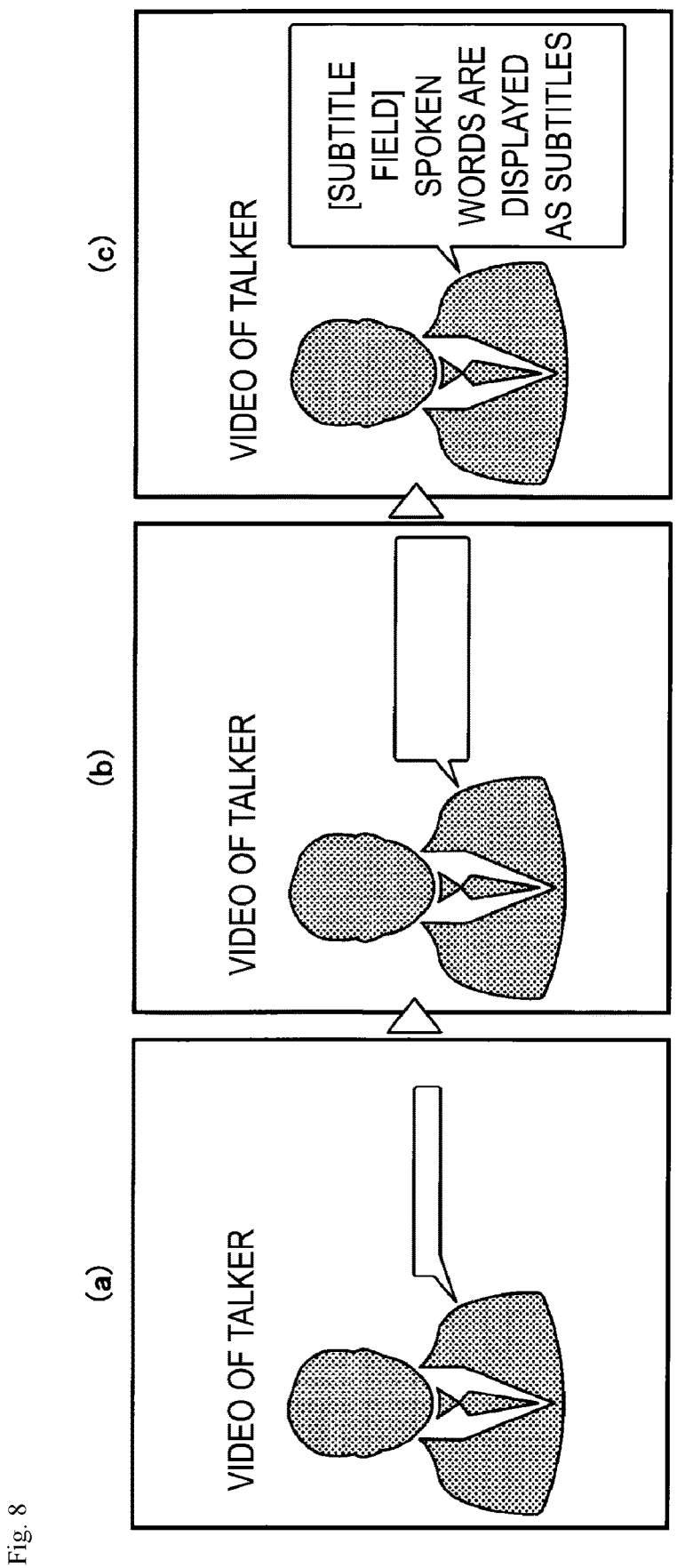
FIG. 8 is a diagram illustrating an example of a subtitle frame display animation.

An exemplary case where the aforementioned animation in which a frame for displaying subtitles is opened is displayed on the reception side is illustrated in FIG. 8. The frame is open in FIGS. 8(a) and 8(b), and words spoken by the talker are displayed as subtitles in FIG. 8(c).

Processing in Case in Which Gap Time Becomes Zero from Positive Value

In a case in which an utterance has ended and processing of the synthetic voice generation unit 105 and the like has been completed, the gap time of the playback timings becomes zero from a positive value. The pseudo video generation unit 108 performs processing of solving the gap between the voice and the video until then as follows in the case in which the gap time of the playback timings becomes zero from the positive value.

First, the pseudo video generation unit 108 performs utterance section detection processing on the video and voice data until a timing after the gap time (real time) after the gap time becomes zero (at the timing when the processing of the synthetic voice generation unit 105 and the like is completed).

In a case in which no utterance is included in the processing section of the utterance section detection processing, the pseudo video generation unit 108 cuts the video and voice data by the amount corresponding to the gap time after the timing at which the processing is completed and performs switching to a real-time video. In a case in which an utterance is included in the processing section, the video and voice data until the timing at which the utterance is started after the processing is completed is cut, and the video and the voice are caused to advance to the timing at which the utterance is started. The aforementioned pseudo video generation processing is performed after the start of the utterance.

Figure 9:
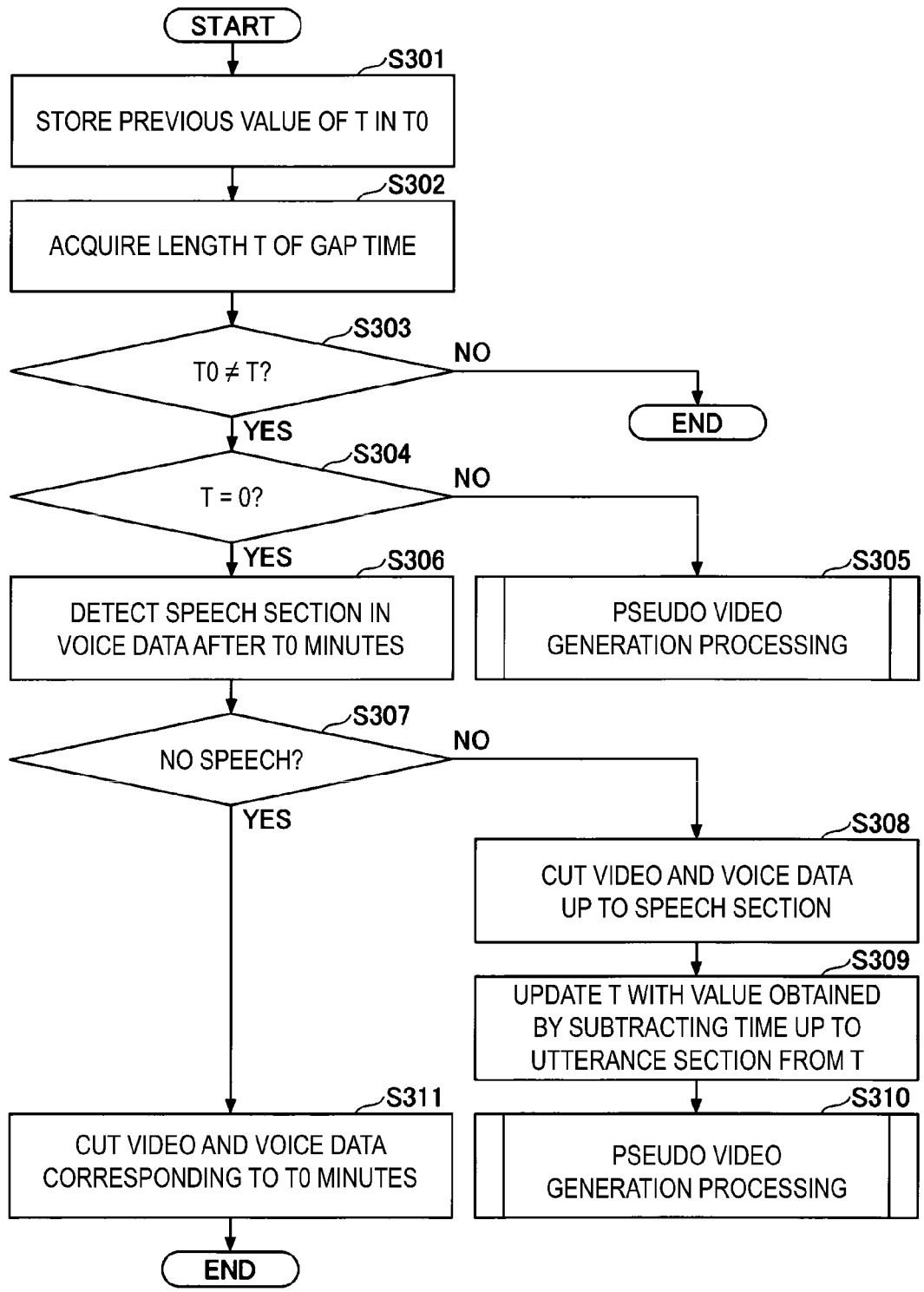
FIG. 9 is a flowchart illustrating operations of the pseudo video generation unit.

A processing example will be described with reference to the flowchart in FIG. 9. It is assumed that the processing of the flowchart in FIG. 9 is repeated at predetermined time intervals.

In S301, the pseudo video generation unit 108 stores the previous T value as T0. In S302, the pseudo video generation unit 108 acquires the length T of the gap time at present. The processing is ended if T0=T, or the processing proceeds to S304 if T0≠T in S303. In S304, the aforementioned pseudo video generation processing is executed if T=0 is not satisfied (S305).

In a case in which T=0 in S304, the processing proceeds to S306, and the pseudo video generation unit 108 detects a speech section of voice data by the amount until T0 from the current timing.

In a case in which there has not been voice generation as a result of the speech section detection (Yes in S307), the processing proceeds to S311, and the pseudo video generation unit 108 cuts the video and voice data by the amount of T0. In a case in which there has been voice generation (No in S307), the processing proceeds to S308, and the pseudo video generation unit 108 cuts the video and voice data until the speech section. In S309, the pseudo video generation unit 108 updates T with the value obtained by subtracting the time until the utterance section from T and performs pseudo video generation processing (S310).

Concerning Accumulation of Video Recording on Transmission Side

Figure 10:
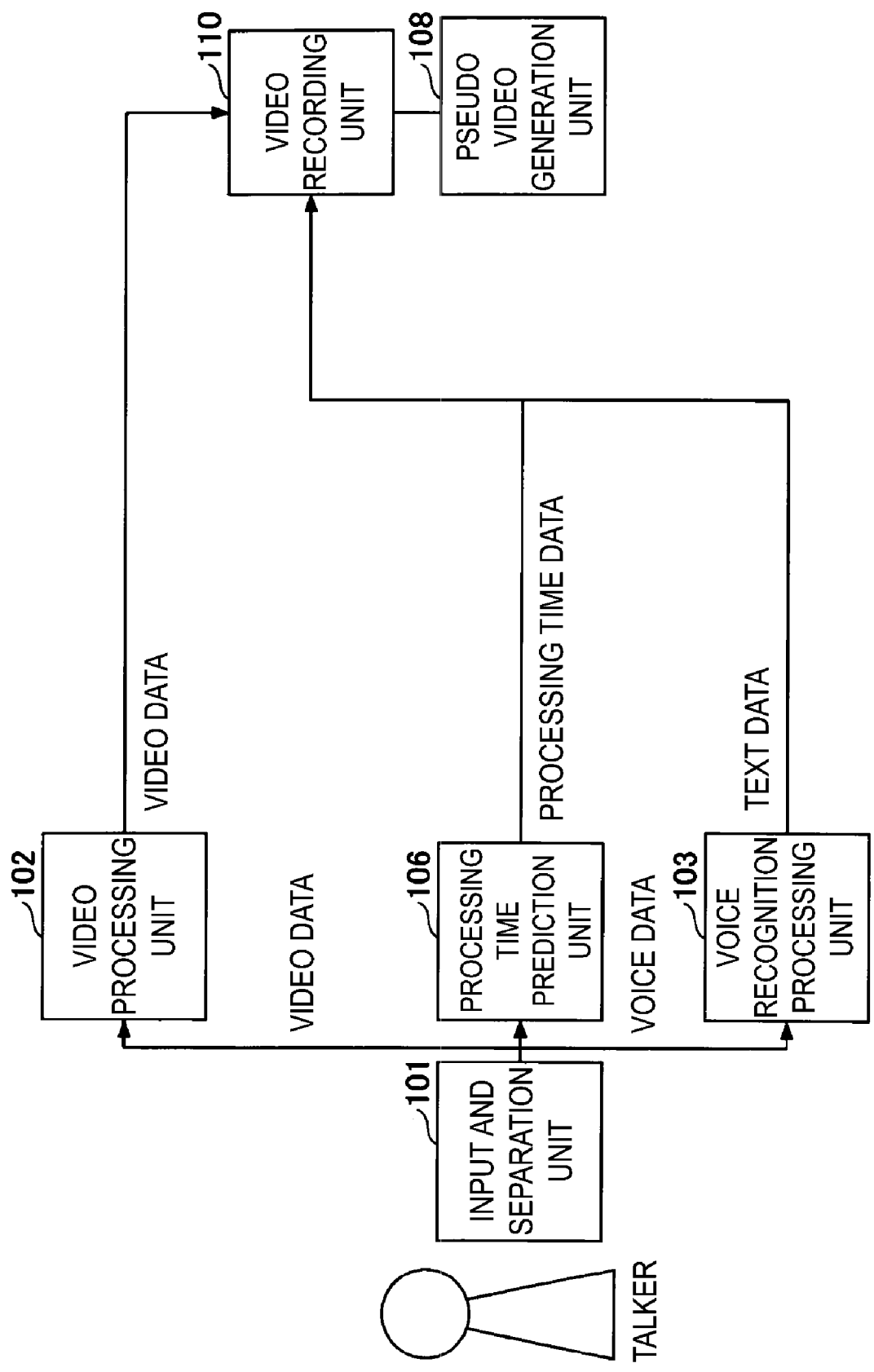
FIG. 10 is a diagram illustrating a configuration related to video accumulation.

In the present embodiment, data can be accumulated in the video recording unit 110 every time the transmission device 100 is used. FIG. 10 illustrates a configuration related to the accumulation processing in the transmission device 100.

Specifically, in a case in which the voice recognition processing unit 103 recognizes some meaningless word such as "well" or "um" or a word related to an agreeable response such as "I see" or "right", it is possible to accumulate video data available for the pseudo video generation unit 108 by recording the video data from the video processing unit 102 at that time by the amount corresponding to the speech time in the video recording unit 110. Also, the length of the speech time is recorded as a playback time. Furthermore, processing time data, text data, and the like may also be recorded in the video recording unit 110 as illustrated in FIG. 10.

As for a motion of correcting the posture or the like, it is possible to accumulate a combination of forward playback and backward playback as video data of a series of motions of a person in the video recording unit 110.

Synthesis and Transmission Unit 111

Next, processing performed by the synthesis and transmission unit 111 will be described. The synthesis and transmission unit 111 combines video data, pseudo video data, synthetic voice data, and subtitle video data and transmits data as a combination of voice and video to the reception device 200 while switching the combination. On the reception side, the listener views and listens to the video, the voice, the subtitles, and the like through a monitor, a speaker, and the like.

In communication, the synthesis and transmission unit 111 first receives the pseudo video data through the processing time prediction unit 106, the time gap length determination unit 107, and the pseudo video generation unit 108 right after the input and separation unit 101 acquires the data first. Then, the synthesis and transmission unit 111 preferentially transmits the pseudo video data.

Next, the synthesis and transmission unit 111 acquires the synthetic voice data and the subtitle video data from the synthetic voice generation unit 105 and the subtitle generation unit 109, respectively, and the video data from the video processing unit 102 through the processing performed by the voice recognition processing unit 103, the translation processing unit 104, and the like. At this time, the synthesis and transmission unit 111 overlay-synthesizes the subtitle video data on the video data, combines it with synthetic voice data, and synthesizes video data including voice and video. Then, the synthesis and transmission unit 111 transmits the synthesized video data instead of the pseudo video data transmitted until then.

Figure 11:
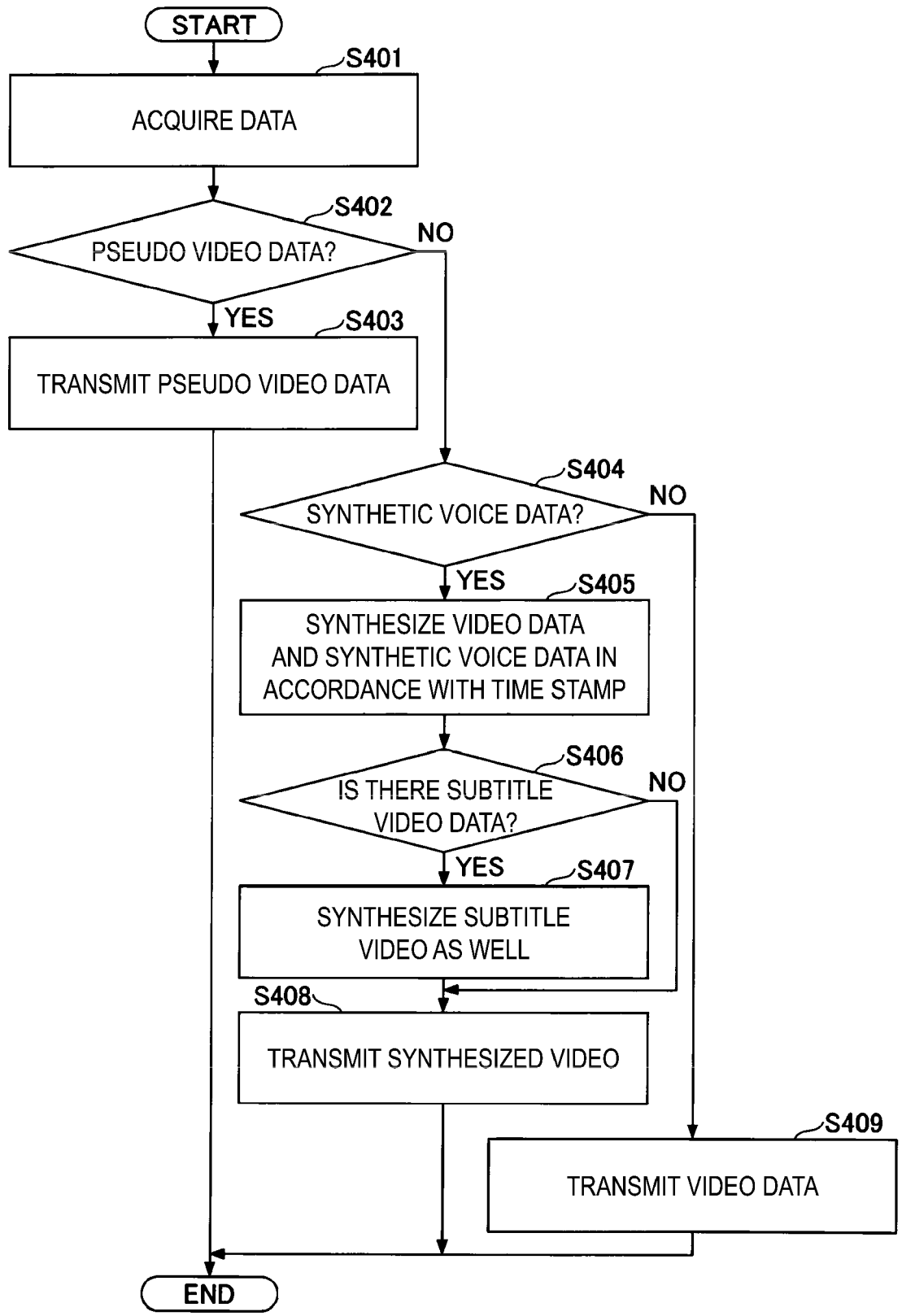
FIG. 11 is a flowchart illustrating operations of a synthesis/transmission unit.

FIG. 11 is a flowchart illustrating processing corresponding to the aforementioned processing. In S401, the synthesis and transmission unit 111 acquires data. In a case in which the acquired data is pseudo video data (Yes in S402), the processing proceeds to S403, and the synthesis and transmission unit 111 transmits the pseudo video data.

In a case in which the acquired data is not pseudo video data (No in S402), the processing proceeds to S404, and the synthesis and transmission unit 111 determines whether the acquired data is synthetic voice data in S404. In a case in which the acquired data is synthetic voice data, the processing proceeds to S405, and the synthesis and transmission unit 111 synthesizes the video data and the synthetic voice data in accordance with time stamps. The video data has been acquired before the acquisition of the synthetic voice data. In a case in which there is a subtitle video (Yes in S406), the synthesis and transmission unit 111 synthesizes the subtitle video with the video data as well. Also, in a case in which there is no synthetic voice data and there is subtitle video data, the subtitle video is synthesized with the video data.

In S408, the synthesis and transmission unit 111 transmits the synthesized video data. In a case in which no synthetic voice data has been acquired (No in S404), the synthesis and transmission unit 111 transmits the video data in S409.

Hardware Configuration Example

Both the transmission device 100 and the reception device 200 according to the present embodiment may be achieved using dedicated hardware circuits or may be realized by causing computers to execute programs describing the details of the processing described in the present embodiment. Further, the "computers" may be physical machines or virtual machines on cloud. In a case where virtual machines are used, "hardware" to be described here is virtual hardware.

The above programs can be stored or distributed with the program recorded on a computer readable recording medium (such as a portable memory). In addition, the above programs can also be provided through a network such as the Internet or e-mail.

Figure 12:
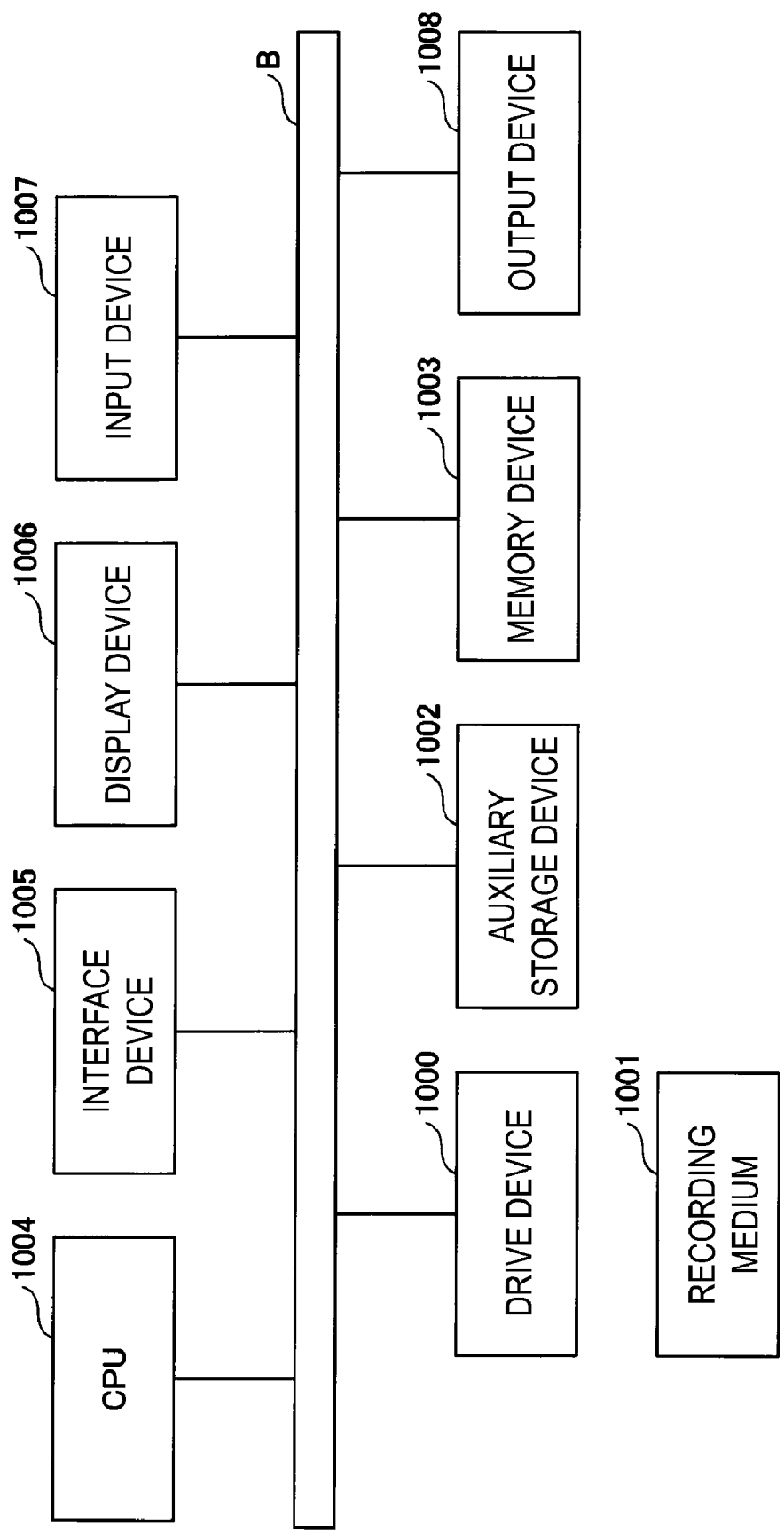
FIG. 12 is a diagram illustrating a hardware configuration example of a device.

FIG. 12 is a diagram illustrating a hardware configuration example of the above-described computer. In FIG. 12, the computer includes a drive device 1000, an auxiliary storage device 1002, a memory device 1003, a CPU 1004, an interface device 1005, a display device 1006, an input device 1007, an output device 1008, and the like, which are connected to one another through a bus BS.

A program for executing processing in the computer is provided by a recording medium 1001 such as, for example, a CD-ROM or a memory card. When the recording medium 1001 having a program stored therein is set in the drive device 1000, the program is installed from the recording medium 1001 through the drive device 1000 to the auxiliary storage device 1002. However, the program does not necessarily have to be installed from the recording medium 1001 and may be downloaded from another computer through a network. The auxiliary storage device 1002 stores the installed program, and stores necessary files, data, and the like.

In response to an activation instruction of the program, the memory device 1003 reads out the program from the auxiliary storage device 1002 and stores the program. The CPU 1004 achieves functions related to the transmission device 100 and the reception device 200 in accordance with the program stored in the memory device 1003. The interface device 1005 is used as an interface for connection to a network. The display device 1006 displays a graphical user interface (GUI) or the like based on the program. The display device 1006 may include a speaker.

The input device 1007 includes a keyboard, a mouse, a button, a touch panel, or the like, and is used for inputting various operation instructions. The input device 1007 may include a microphone. The output device 1008 outputs the calculation result.

Summary and Effects of Embodiment

As described above, according to the present embodiment, the following display is performed on the screen of the receiver, for example, until playback is started in order for the receiver not to be aware of a delay until a timing of a start of playback of a video and voice at the time of voice generation on the receiver side after a timing of an input of video and voice data caused by the voice generation of the talker.

(a) Relatively long voice and a video of a nodding motion of the talker, thinking with the face directed downward, and the like (b) A relatively short video of a change in posture of the talker from a listening posture to a posture of starting to talk, body shaking, and the like (c) A subtitle frame display animation video that presents transcription of voice The pseudo video generation unit 108 can change the combination of (a) to (c) depending on the length of the delay time until the start of the playback on the receiver side from the start of the speech of the talker. For example, only (c) is displayed in a case in which the length of the delay time is short, (b) is displayed in a case in which the length of the delay time is at a middle level, and all of (a) to (c) are displayed in a case in which the length of the delay time is long. In a case in which the length of the delay time is further longer, a plurality of combinations of (a) and (b) can be displayed.

Also, it is possible to use video data recording motions of the talker as (a) the video data of a nodding motion and (b) the video data of the change in posture. Also, it is possible to enhance prediction of time required for the processing of voice recognition, translation, and synthesis through learning.

Using the scheme according to the present embodiment as described above enables synthesized and converted voice or text information and video information to be played back at the same time by making the recipient unaware of a delay, thus enabling communication in which meaning can be accurately conveyed.

Conclusion of Embodiment

The description describes at least the transmission device, the communication method, and the program described in each item below.

[Item 1]

A transmission device used on a talker side in a communication system for communication between a talker and a receiver, the transmission device including:

a processing unit that processes voice data obtained from speech of the talker to generate information data corresponding to the voice data;

a pseudo video generation unit that generates pseudo video data having a playback time length corresponding to a length of a delay time caused by the processing unit; and a transmission unit that transmits the pseudo video data to the receiver side and then transmits video data during the speech of the talker and the information data to the receiver side.

[Item 2]

The transmission device according to Item 1, in which the pseudo video generation unit selects, from among a plurality of pieces of the video data obtained in advance, one or more pieces of video data and generates the pseudo video data from the one or more pieces of video data selected.

[Item 3]

The transmission device according to Item 2, in which the plurality of pieces of the video data obtained in advance includes video data of a nodding motion of the talker, video data of a change in posture of the talker, and video data of an animation display of a subtitle frame, and the pseudo video generation unit selects one piece of video data or two or all pieces of video data from among the video data of the nodding motion of the talker, the video data of the change in posture of the talker, and the video data of the animation display of the subtitle frame in accordance with the length of the delay time.

[Item 4]

The transmission device according to any one of Items 1 to 3, including a determination unit that determines the length of the delay time based on a difference between a time stamp of the voice data to be processed by the processing unit and a time stamp of video data obtained in real time.

[Item 5]

The transmission device according to any one of Items 1 to 4, in which the processing unit performs translation processing on text data converted from the voice data and generates synthetic voice data or subtitle video data in accordance with obtained translation data.

[Item 6]

A communication method executed by a transmission device used on a talker side in a communication system for communication between a talker and a receiver, the method including:
  processing voice data obtained from speech of the talker to generate information data corresponding to the voice data;
  generating pseudo video data with a playback time length corresponding to a length of a delay time caused by the processing; and
  transmitting the pseudo video data to the receiver side and then transmitting video data during the speech of the talker and the information data to the receiver side.

[Item 7]

A program causing a computer to operate as an individual unit in the communication device according to any one of Items 1 to 5.

Although the present embodiment has been described above, the present disclosure is not limited to such a specific embodiment and can be modified and changed variously without departing from the scope of the present disclosure described in the appended claims.

REFERENCE SIGNS LIST

100 Transmission device
101 Input and separation unit
102 Video processing unit
103 Sound recognition processing unit
104 Translation processing unit
105 Synthetic voice generation unit
106 Processing time prediction unit
107 Time gap length determination unit
108 Pseudo video generation unit
109 Subtitle generation unit
110 Video recording unit
111 Synthesis and transmission unit
200 Reception device
201 Reception unit
202 Output unit
1000 Drive device
1001 Recording medium
1002 Auxiliary storage device
1003 Memory device
1004 CPU
1005 Interface device
1006 Display device
1007 Input device
1008 Output device

The invention claimed is:

1. A transmission device used by a talker in a communication system for communication between the talker and a receiver, the transmission device comprising a processor configured to execute operations comprising:
  processing voice data obtained from speech of the talker to generate information corresponding to the voice data, wherein the voice data comprises speech video data of the speech of the talker;
  generating pseudo video data by selecting, based on a length of a delay time caused by the processing voice data, a piece of candidate video data from a plurality of pieces of candidate video data depicting the talker, wherein the pseudo video data comprises a playback duration corresponding to the length of a delay time caused by the processing voice data, and the pseudo video data is configured to enable a multi-modal communication with the receiver to make the receiver unaware of the delay time;
  transmitting the pseudo video data to the receiver; and
  subsequent to completion of the transmitting the pseudo video data, transmitting speech video data of the speech of the talker and the information to the receiver.

2. The transmission device according to claim 1, wherein the generating further comprises selecting, from the plurality of pieces of candidate video data, one or more pieces of candidate video data and generating the pseudo video data from the selected one or more pieces of candidate video data.

3. The transmission device according to claim 2, wherein the plurality of pieces of the candidate video data comprises at least one of
  first predetermined video data of a nodding motion of the talker for a first predetermined playback duration,
  second predetermined video data of a change in posture of the talker for a second predetermined playback duration, or
  third predetermined video data of an animation display of a predetermined subtitle frame for a third predetermined playback duration, and
  wherein the generating further comprises selecting the one or more pieces of candidate video data among the plurality of pieces of the candidate video data in accordance with a combination of the length of the delay time and a respective predetermined playback duration of a respective piece of the plurality of pieces of the candidate video data, and the first predetermined playback duration is distinct from the third predetermined playback duration.

4. The transmission device according to claim 2, the processor further configured to execute a method comprising:
  determining the length of the delay time based on a difference between a time stamp of the voice data to be processed by the processing the voice data and a time stamp of video data obtained in real time.

5. The transmission device according to claim 2, wherein the processing voice data further comprises performing translation processing on text data converted from the voice data and generating synthetic voice data or subtitle video data in accordance with the text data.

6. The transmission device according to claim 1, the processor further configured to execute a method comprising:
determining the length of the delay time based on a difference between a time stamp of the voice data to be processed by the processing voice data and a time stamp of video data obtained in real time.

7. The transmission device according to claim 1, wherein the processing voice data further comprises performing translation processing on text data converted from the voice data and generating synthetic voice data or subtitle video data in accordance with the text data.

8. A computer implemented method for communicating between a talker and a receiver, the method comprising:
generating, based on processing voice data obtained from speech of the talker, information corresponding to the voice data, wherein the voice data comprises speech video data of the speech of the talker;
generating pseudo video data by selecting, based on a length of a delay time caused by the processing voice data, a piece of candidate video data from a plurality of pieces of candidate video data depicting the talker, wherein the pseudo video data comprises a playback duration corresponding to the length of a delay time caused by the processing the voice data, and the pseudo video data is configured to enable a multi-modal communication with the receiver to make the receiver unaware of the delay time;
transmitting the pseudo video data to the receiver; and
subsequent to completion of the transmitting the pseudo video data, transmitting the speech video data of the speech of the talker and the information to the receiver.

9. The computer implemented method according to claim 8, wherein
the generating pseudo video data further comprises selecting, from the plurality of pieces of candidate video data, one or more pieces of candidate video data and generating the pseudo video data from the one or more pieces of candidate video data selected.

10. The computer implemented method according to claim 9, wherein
the plurality of pieces of the candidate video data comprises at least one of:
first predetermined video data of a nodding motion of the talker for a first predetermined playback duration,
second predetermined video data of a change in posture of the talker for a second predetermined playback duration, or
third predetermined video data of an animation display of a predetermined subtitle frame for a third predetermined playback duration, and
wherein the generating pseudo video data further comprises selecting at least one piece of video data among the plurality of pieces of the video data in accordance with a combination of the length of the delay time and a respective predetermined playback duration of a respective piece of the plurality of pieces of the candidate video data, and the first predetermined playback duration is distinct from the third predetermined playback duration.

11. The computer implemented method according to claim 9, further comprising:
determining the length of the delay time based on a difference between a time stamp of the voice data to be processed by the processing voice data and a time stamp of video data obtained in real time.

12. The computer implemented method according to claim 9, wherein
the processing voice data further comprises performing translation processing on text data converted from the voice data and generating synthetic voice data or subtitle video data in accordance with the text data.

13. The computer implemented method according to claim 8, further comprising:
determining the length of the delay time based on a difference between a time stamp of the voice data to be processed by the processing voice data and a time stamp of video data obtained in real time.

14. The computer implemented method according to claim 8, wherein
the processing voice data further comprises performing translation processing on text data converted from the voice data and generating synthetic voice data or subtitle video data in accordance with the text data.

15. A computer-readable non-transitory recording medium storing computer-executable program instructions that when executed by a processor cause a computer to execute operations comprising:
generating, based on processing voice data obtained from speech of a talker for communicating between the talker and a receiver, information corresponding to the voice data, wherein the voice data comprises speech video data of the speech of the talker;
generating pseudo video data by selecting, based on a length of a delay time caused by the processing voice data, a piece of candidate video data from a plurality of pieces of candidate video data depicting the talker, wherein the pseudo video data comprises a playback duration corresponding to the length of a delay time caused by the processing the voice data, and the pseudo video data is configured to enable a multi-modal communication with the receiver to make the receiver unaware of the delay time;
transmitting the pseudo video data to the receiver; and
subsequent to completion of the transmitting the pseudo video data, transmitting the speech video data of the speech of the talker and the information to the receiver.

16. The computer-readable non-transitory recording medium according to claim 15, wherein
the generating pseudo video data further comprises selecting, from the plurality of pieces of candidate video data, one or more pieces of candidate video data and generating the pseudo video data from the one or more pieces of candidate video data selected.

17. The computer-readable non-transitory recording medium according to claim 16, wherein
the plurality of pieces of the candidate video data comprises at least one of:
first predetermined video data of a nodding motion of the talker for a first predetermined playback duration,
second predetermined video data of a change in posture of the talker for a second predetermined playback duration, or
third predetermined video data of an animation display of a predetermined subtitle frame for a third predetermined playback duration, and wherein the generating pseudo video data further comprises selecting at least one piece of candidate video data among the plurality of pieces of the candidate video data in accordance with a combination of the length of the delay time and a respective predetermined playback duration of a respective piece of the plurality of pieces of the candidate video data, and the first predetermined playback duration is distinct from the third predetermined playback duration.

18. The computer-readable non-transitory recording medium according to claim 16, the computer-executable program instructions when executed further causing the computer to execute a method comprising:
   determining the length of the delay time based on a difference between a time stamp of the voice data to be processed by the processing voice data and a time stamp of video data obtained in real time.

19. The computer-readable non-transitory recording medium according to claim 15, the computer-executable program instructions when executed further causing the computer to execute a method comprising:
   determining the length of the delay time based on a difference between a time stamp of the voice data to be processed by the processing voice data and a time stamp of video data obtained in real time.

20. The computer-readable non-transitory recording medium according to claim 15, wherein the processing voice data further comprises performing translation processing on text data converted from the voice data and generating synthetic voice data or subtitle video data in accordance with the text data.

* * * * *